Feb. 3, 1970     G. W. ONKSEN     3,493,740
HEADLAMP CAPSULE
Filed June 21, 1967
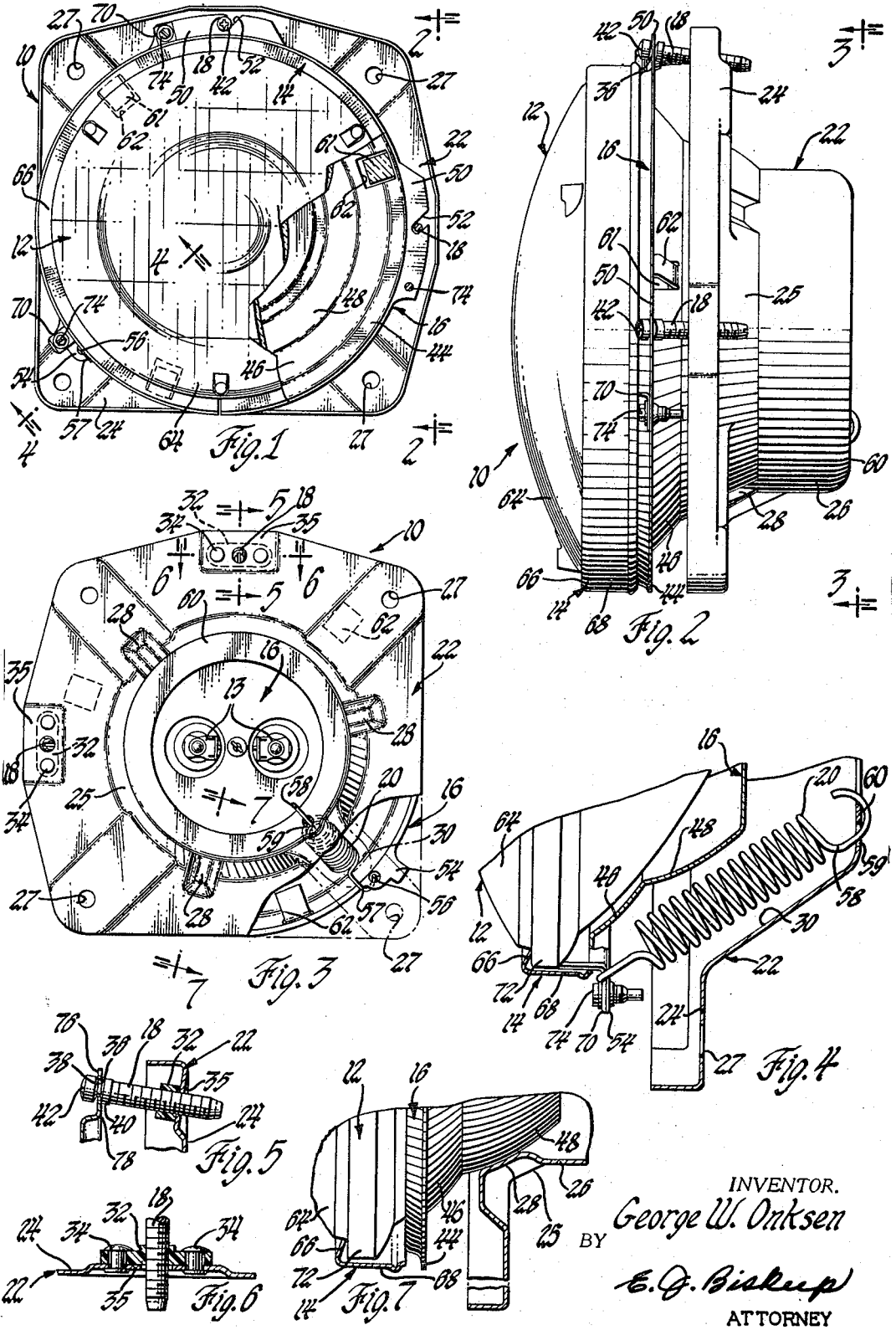
INVENTOR.
George W. Onksen
BY
E. G. Biskup
ATTORNEY United States Patent Office 3,493,740
Patented Feb. 3, 1970

3,493,740
HEADLAMP CAPSULE
George W. Onksen, Anderson, Ind., assignor to General Motors Corporation, Detroit, Mich., a corporation of Delaware
Filed June 21, 1967, Ser. No. 647,705
Int. Cl. F21v 7/00
U.S. Cl. 240—41.6                   3 Claims

ABSTRACT OF THE DISCLOSURE

A headlight assembly having a headlamp, a mounting ring, adjusting screws and a housing. The headlamp is secured to a mounting ring which is universally adjustable with respect to the housing about a horizontal or vertical axis. Two inclined adjusting screws are threaded to the housing and annular grooves in their head portions continuously engage the front and rear surfaces of the mounting ring so that lost motion is eliminated in the aiming of the headlamp. The positive adjustable connection provided by inclined adjusting screws also serve to maintain the aimed position of the headlamp despite jarring and vibrating of the assembly.

---

Previous headlamp assemblies have used constructions wherein a headlamp secured to a mounting ring is selectively tiltable with respect to a housing about a horizontal or vertical axis by screws adjustably connected between the mounting ring and the housing. The head portion of each screw normally includes a groove that is received within a slot formed in the mounting ring and has one of its surfaces engaging the mounting ring. Additionally, one or more compensating springs are employed to bias the mounting ring rearwardly into sliding engagement with the housing.

It has been found that designs of the above-described type may be subject to misalignment during and after headlamp aiming. Inasmuch as only one surface of the groove is intended to contact the mounting ring, a lost motion gap is present that, under certain conditions, could account for some difficulty in realizing positive adjustment of the headlamp position. Tests have shown that in order to obtain optimum restraint of the headlamp assembly, each adjusting screw should directly engage the mounting ring in a manner that prevents the headlamp and mounting ring from oscillating between the surfaces of the groove when the assembly is jarred or vibrated. The compensating spring has in fact served this function by biasing the mounting ring rearwardly into engagement with the housing. However, at times, binding can occur between parts during the aiming of the headlamp so as to cause the mounting ring to raise off the housing due to insufficient force against the bearing points opposite the spring. As a result, the mounting ring could subsequently seat against the bearing surfaces in an out-of-line position and cause an improper headlamp aim.

The headlamp assembly made in accordance with the present invention uses two adjusting screws and a spring, all of which are inclined with respect to the longitudinal axis of the headlamp, to more accurately obtain and maintain proper headlamp alignment. The adjusting screws have grooves formed in the head portions that are received within slots formed in the mounting ring. The grooves are appropriately formed so that the opposing surfaces thereof are in constant contact with the front and rear surfaces of the mounting ring, respectively, thereby eliminating the aforementioned lost motion gaps and allowing the mounting ring to be positively moved by inward and outward adjustment of the screws. The spring is located diametrically opposite a point midway between the screws and because of its longitudinal inclination it exerts both radially inward and rearward force components to firmly bias the mounting ring into sliding contact with a diametrically opposed bearing surface, thereby minimizing the possibility that the mounting ring will lift off the bearing surface if binding occurs during the aiming of the headlamp.

Accordingly, the objects of the present invention are: to provide a headlamp assembly wherein the headlamp is securely and positively retained against misalignment after initial aiming; to provide a headlamp assembly wherein lost motion in the adjusting screws is eliminated by forming a groove in the heads of each screw and inclining the screws with respect to the axis of the headlamp so that the opposing surfaces of the groove continuously engage the front and rear surfaces of the mounting ring; and to provide a headlamp assembly wherein a headlamp, attached to a mounting ring, can be selectively tilted about a horizontal or vertical axis with respect to a housing by screws adjustably connected to the housing and in constant engagement with the mounting ring and wherein a tensioned spring located opposite the adjusting screws exerts radially inward and rearward force components that, in conjunction with the adjusting screws, securely hold the headlamp and the mounting ring to the housing so proper headlamp positioning is maintained.

These and other objects of the present invention will become apparent to one skilled in the art upon reading the following detailed description, reference being made to the accompanying drawing in which:

FIGURE 1 is a front partial cross-sectional view of a headlamp assembly made in accordance with the present invention;

FIGURE 2 is an enlarged view of the headlamp assembly taken along line 2—2 of FIGURE 1;

FIGURE 3 is a rear partial cross-sectional view of the lamp assembly shown in FIGURE 1;

FIGURE 4 is an enlarged sectional view taken along line 4—4 of FIGURE 1;

FIGURE 5 is an enlarged sectional view taken along line 5—5 in FIGURE 3;

FIGURE 6 is an enlarged sectional view taken along line 6—6 in FIGURE 3; and

FIGURE 7 is an enlarged sectional view taken along line 7—7 of FIGURE 3.

Referring to the drawings, a headlamp assembly 10, in general, comprises a conventional sealed beam headlamp 12 incldues a pair of spaced terminals 13, a retaining ring 14, a mounting ring 16, two adjusting screws 18, a spring 20, and a housing 22.

As shown in FIGURES 1 and 2, the housing 22 is a sheet metal stamping and comprises a substantially rectangular mounting surface 24 integrally formed with a conical wall 25 and a rearwardly extending base portion 26 having a cylindrical cavity the axis of which is normal to the mounting surface 24. A hole 27 is formed at each of the corners of the mounting surface 24 to permit attachment of the housing 22 to a vehicle. Three equally spaced inclined bearing blocks 28 are formed in the conical wall 25 adjacent the frontal cavity opening as seen in FIGURES 3 and 7. An inclined U-shaped channel 30, adapted to receive the spring 20, is formed along the base portion 26. As best shown in FIGURES 3, 5, and 6, two threaded nylon blocks 32 are attached by rivets 34 to an inwardly and rearwardly inclined ramp surface 35 formed at the sides of the mounting surface 24 and are located substantially 90° apart with respect to the axis of the cavity. When threaded through the blocks 32, the axis of the screws 18 are inclined rearwardly and radially inwardly with respect to the axis of the cavity. For purposes to be described below and as shown in FIGURE 5, each adjusting screw 18 has a groove 36 including a front bearing surface 38 and a rear bearing surface 40 formed in the head portion 42.

As best seen in FIGURES 2 and 4, the mounting ring 16 includes an outwardly extending annular rim 44, a conical midsection 46, and a rearwardly extending spherical portion 48 that engages the bearing blocks 28 and permits universal adjustment of the mounting ring 16 relative to the housing 22. Two mounting ears 50, integrally formed at the outer periphery of the annular rim 44, includes slots 52 that are located substantially 90° apart in relative positions corresponding to the adjusting screws 18 and are angled to aid in retaining the head portion 42 after assembly. A ledge 54, formed at the outer edge of the annular rim 44 diametrically opposite a point midway between the slots 52, has an aperture 56 formed therein that serves to secure one end 57 of the spring 20 to the mounting ring 16. The other end 58 of the spring 20 is inserted through a similar aperture 59 located relatively inwardly with respect to aperture 56 at the annular rear face 60 of the housing 22 so that when the spring 20 is tensioned therebetween its axis is inclined with respect to the axis of the cavity thereby providing rearward and inward force components. The inward force component positively urges the spherical portion 48 into continuous engagement with a diametrically opposite bearing block 28 while the rearward component seats the spherical position 48 securely against the other blocks 28. As seen in FIGURES 1 and 4, the headlamp 12 has rearwardly extending lugs 61 that engage notches 62 formed in the conical midsection 46 to locate the headlamp lens 64 within the mounting ring 16 substantially parallel to the annular ring 44. The retaining ring 14 includes an annular top rim 66 and a cylindrical sleeve portion 68 having L-shaped tabs 70 spot welded to its inner surface at locations corresponding to the relative positions of the mounting ears 50 and the ledge 54. After the headlamp 12 has been positioned within the mounting ring 16, the retaining ring 14 is placed over the headlamp 12 so that the rim 66 engages the outer periphery 72 of the headlamp lens 64. Appropriate openings are formed in the tabs 70, mounting ears 50, and ledge 54 so that the retaining ring 14 may be clamped to the mounting ring 16 by self tapping screws 74 or other suitable fasteners thereby positively and compressively retaining the headlamp 12.

As previously mentioned and as shown most clearly in FIGURE 5, the grooves 36 in the head portions 42 of the adjusting screws 18 are retained within the slots 52. The inclination of the screw 18, the width and shape of the groove 36, and the thickness of the rim are geometrically selected so that the bearing surface 38 partially contacts the front surface 76 while bearing surface 40 partially contacts the rear surface 78 thus allowing the headlamp lens 64 to be positively tilted about a horizontal or vertical axis with respect to the housing 22 by inward or outward adjustment of the adjusting screws 18. As previously mentioned, the rearward and inward forces exerted by the spring 20 securely seat the spherical portion 48 against the bearing blocks 28 thereby minimizing the possibility that headlamp position will be affected by vibation or jarring. Tests have shown that a headlamp assembly made in accordance with the present invention will withstand repeated applications of 50 pound loads to the headlamp lens 64 and retain its aimed position.

While the described embodiment is adapted for a single headlamp it will be apparent that the housing could be suitably formed to receive a second headlamp thereby allowing this invention to be successfully incorporated into a dual headlamp arrangement. Since other changes and modifications will be obvious to one skilled in the art, the invention, as defined in the appended claims, is intended to cover such alterations of the described embodiment.

What is claimed is:

1. A headlamp assembly comprising: a housing member; a mounting member including a radially outwardly extending rim having slots formed therein; a headlamp carried by said mounting member; means for universally adjusting the position of said headlamp relative to said housing member including a pair of adjusting screws operatively connecting said mounting member to said housing member, each of said screws having an axis inclined with respect to said rim and including an annular groove formed in an end portion thereof which is defined by axially spaced surfaces, said end portions being received within said slots such that said axially spaced surfaces of said grooves continuously engage opposed surfaces of said rim adjacent said slots thereby forming positive adjustable connections that eliminate lost motion in the aiming of the headlamp and serve to maintain the aimed position thereof despite jarring and vibrating of the assembly.

2. A headlamp assembly comprising: a housing adapted to be secured to a motor vehicle; an opening formed in said housing having an axis normal to the latter; a plurality of raised bearing surfaces formed on the front surface of the housing adjacent said opening; a mounting ring having a spherical portion engaging the bearing surfaces to form a universal connection between said mounting ring and said housing, said mounting ring including an annular rim having slots formed therein which are circumferentially spaced substantially 90° apart with respect to said axis; two adjusting screws adjustably connected to the housing and circumferentially spaced substantially the same as said slots, said screws being radially inwardly inclined with respect to said axis and said rim; a groove formed in a head portion of each screw defined by axially spaced surfaces which, when received within said slots, continuously engage the opposed surfaces of said rim adjacent said slot; a headlamp carried on the mounting ring; and spring means tensioned between said mounting ring and said housing for exerting radially rearward and inward force components at said universal connection to prevent separation of said spherical portion from said bearing surfaces during inward and outward movement of said adjusting screws whereby said adjusting screws and said mounting ring form positive adjustable connections that eliminate lost motion in the aiming of the headlamp and in conjunction with said spring means minimize the possibility that the aimed position of the headlamp will be effected by vibration or jarring.

3. A headlamp assembly comprising: a housing including a rectangular mounting plate adapted to be attached to a motor vehicle; an opening formed in said mounting plate having an axis normal to the housing; bearing surfaces formed on the mounting plate adjacent to and equally circumferentially spaced about said opening; a generally circular mounting ring having a spherical portion engaging the bearing surfaces to form the universal connection between the mounting ring and the housing, said mounting ring including an annular rim having two outwardly extending mounting ears spaced 90° apart with respect to said spherical portion; a slot formed in each mounting ear; two adjusting screws adjustably connected to the housing and circumferentially spaced substantially the same as said slots, said screws being radially inwardly inclined with respect to said axis and said mounting ears; a groove formed in a head portion of each screw that is defined by axially spaced surfaces, said head portions being received within said slots such that said axially spaced surfaces of said grooves continuously engage opposed surfaces of said mounting ears adjacent said slots; a headlamp carried on the mounting ring; and a tensioned spring having one end secured to said rim at a first point and the other end secured to the mounting plate at a second point located radially inwardly and rearwardly with respect to the first point, said spring exerting radially rearward and inward force components at said universal connection to prevent separation of said spherical portion from said bearing surfaces during inward and outward movement of said adjusting screws whereby the latter and said mounting ring form positive adjustable connections that eliminate lost motion in the aiming of the headlamp and with said spring serve to maintain the aimed position of the assembly despite jarring or vibration.

References Cited
UNITED STATES PATENTS

| | | | |
|---|---|---|---|
| 2,266,329 | 12/1941 | Mead et al. | 240—41.6 XR |
| 2,504,327 | 4/1950 | Gross | 240—41.6 |
| 2,824,215 | 2/1958 | Goff | 240—41.6 |
| 2,826,682 | 3/1958 | Falge | 240—41.6 XR |
| 2,868,961 | 1/1959 | Worden | 240—44 XR |
| 2,911,523 | 11/1959 | Falge et al. | 240—41.6 |

NORTON ANSHER, Primary Examiner

ROBERT P. GREINER, Assistant Examiner

U.S. Cl. X.R.

240—44